United States Patent
Gupta et al.

(10) Patent No.: US 11,611,794 B2
(45) Date of Patent: *Mar. 21, 2023

(54) SYSTEMS AND METHODS FOR MINIMIZING OBSTRUCTION OF A MEDIA ASSET BY AN OVERLAY BY PREDICTING A PATH OF MOVEMENT OF AN OBJECT OF INTEREST OF THE MEDIA ASSET AND AVOIDING PLACEMENT OF THE OVERLAY IN THE PATH OF MOVEMENT

(71) Applicant: Rovi Guides, Inc., San Jose, CA (US)

(72) Inventors: Vikram Makam Gupta, Karnataka (IN); Vishwas Sharadanagar Panchaksharaiah, Tumkur District (IN)

(73) Assignee: Rovi Guides, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/358,701

(22) Filed: Jun. 25, 2021

(65) Prior Publication Data

US 2021/0400333 A1 Dec. 23, 2021

Related U.S. Application Data

(63) Continuation of application No. 16/466,758, filed as application No. PCT/US2016/066281 on Dec. 13, 2016, now Pat. No. 11,076,200.

(51) Int. Cl.
*H04N 21/43* (2011.01)
*H04N 21/431* (2011.01)
(Continued)

(52) U.S. Cl.
CPC ..... *H04N 21/4316* (2013.01); *H04N 21/2187* (2013.01); *H04N 21/44008* (2013.01);
(Continued)

(58) Field of Classification Search
CPC ........... H04N 21/4316; H04N 21/2187; H04N 21/44008; H04N 21/4532; H04N 21/466;
(Continued)

(56) References Cited

U.S. PATENT DOCUMENTS

| 5,751,364 A | * | 5/1998 | Yasuda | ................ | H04N 19/51 |
| | | | | | 375/E7.102 |
| 5,969,755 A | * | 10/1999 | Courtney | .............. | G06F 16/786 |
| | | | | | 375/E7.263 |

(Continued)

FOREIGN PATENT DOCUMENTS

| CN | 101578625 A | 11/2009 |
| CN | 101930779 A | 12/2010 |

(Continued)

OTHER PUBLICATIONS

International Preliminary Report of Patentability of PCT/US2016/066281 dated Mar. 1, 2019.

(Continued)

*Primary Examiner* — Jefferey F Harold
*Assistant Examiner* — Timothy R Newlin
(74) *Attorney, Agent, or Firm* — Haley Guiliano LLP

(57) ABSTRACT

Systems and methods are provided herein for minimizing obstruction of a media asset by an overlay by predicting a path of movement of an object of interest of the media asset and avoiding placement of the overlay in the path of movement. To this end, a media guidance application may detect an object of interest in a first frame of a media asset, and may determine a determining a first location of the object in the first frame and a second location of the object of interest in a second frame. The media guidance application may calculate, based on the first location and the second location, a projected location of the object of interest in a third frame of the media asset, and may generate for display (Continued)

an overlay in a location that does not overlap with any of the first location, the second location, and the projected location.

20 Claims, 6 Drawing Sheets

(51) Int. Cl.
*H04N 21/2187* (2011.01)
*H04N 21/44* (2011.01)
*H04N 21/45* (2011.01)
*H04N 21/466* (2011.01)
*H04N 21/81* (2011.01)

(52) U.S. Cl.
CPC ....... *H04N 21/4532* (2013.01); *H04N 21/466* (2013.01); *H04N 21/8133* (2013.01)

(58) Field of Classification Search
CPC ........... H04N 21/8133; H04N 21/8126; H04N 21/4312; G06Q 30/02; G06T 11/60
See application file for complete search history.

(56) References Cited

U.S. PATENT DOCUMENTS

| | | | |
|---|---|---|---|
| 6,233,283 B1* | 5/2001 | Chiu | H04N 19/115 375/E7.091 |
| 6,239,794 B1 | 5/2001 | Yuen et al. | |
| 6,388,714 B1 | 5/2002 | Schein et al. | |
| 6,564,378 B1 | 5/2003 | Sai et al. | |
| 6,756,997 B1 | 6/2004 | Ward et al. | |
| 7,165,098 B1 | 1/2007 | Boyer et al. | |
| 7,206,029 B2* | 4/2007 | Cohen-Solal | H04N 21/4316 348/565 |
| 7,761,892 B2 | 7/2010 | Ellis et al. | |
| 8,046,801 B2 | 10/2011 | Ellis et al. | |
| 9,668,023 B1 | 5/2017 | Twyman et al. | |
| 9,961,378 B1 | 5/2018 | Jhaveri | |
| 2002/0070957 A1* | 6/2002 | Trajkovic | H04N 21/4858 348/E9.037 |
| 2002/0174430 A1 | 11/2002 | Ellis et al. | |
| 2003/0110499 A1 | 6/2003 | Knudson et al. | |
| 2004/0126020 A1* | 7/2004 | Sakuyama | H04N 19/13 375/E7.076 |
| 2005/0251827 A1 | 11/2005 | Ellis et al. | |
| 2007/0252804 A1* | 11/2007 | Engel | H04N 13/395 345/98 |
| 2008/0030515 A1* | 2/2008 | Kwon | H04N 21/41407 345/531 |
| 2008/0231751 A1* | 9/2008 | Zalewski | H04N 21/4312 348/E5.067 |
| 2010/0061448 A1* | 3/2010 | Zhou | H04N 19/87 375/240.03 |
| 2010/0153885 A1 | 6/2010 | Yates | |
| 2010/0329571 A1 | 12/2010 | Subramanian et al. | |
| 2011/0037896 A1* | 2/2011 | Lin | H04N 21/4438 348/564 |
| 2011/0078623 A1* | 3/2011 | Liu | G06Q 30/02 715/791 |
| 2011/0178854 A1* | 7/2011 | Sofer | H04N 21/25891 715/738 |
| 2011/0188836 A1* | 8/2011 | Popkiewicz | G11B 27/036 386/300 |
| 2011/0321084 A1* | 12/2011 | Takahashi | H04N 5/2723 725/32 |
| 2012/0075535 A1* | 3/2012 | Van Beek | H04N 5/145 348/E5.062 |
| 2013/0061262 A1* | 3/2013 | Briggs | H04N 21/8455 725/32 |
| 2013/0117772 A1 | 5/2013 | Sugiyama et al. | |
| 2013/0227622 A1* | 8/2013 | Landow | H04N 21/2353 725/93 |
| 2014/0043534 A1* | 2/2014 | Nakaoka | H04N 21/4858 348/563 |
| 2014/0079118 A1* | 3/2014 | Dedeoglu | H04N 19/124 375/240.08 |
| 2014/0133837 A1* | 5/2014 | Mate | G11B 27/031 386/278 |
| 2014/0140680 A1* | 5/2014 | Jo | H04N 21/812 386/241 |
| 2014/0344743 A1 | 11/2014 | Han et al. | |
| 2015/0062434 A1* | 3/2015 | Deng | H04N 21/440263 348/565 |
| 2016/0066024 A1* | 3/2016 | Gaziel | H04N 5/445 348/564 |
| 2016/0112727 A1* | 4/2016 | Mate | H04N 21/23418 725/32 |
| 2017/0195613 A1* | 7/2017 | Yang | H04N 5/268 |
| 2017/0374431 A1* | 12/2017 | Ryan | H04N 21/4122 |

FOREIGN PATENT DOCUMENTS

| | | |
|---|---|---|
| CN | 104103081 A | 10/2014 |
| CN | 104238911 A | 12/2014 |
| CN | 104333449 A | 2/2015 |
| CN | 104408644 A | 3/2015 |
| CN | 104905812 A | 9/2015 |
| CN | 105022756 A | 11/2015 |
| EP | 1416727 A1 | 5/2004 |
| EP | 1417727 A2 | 5/2004 |
| KR | 20020078707 A | 10/2002 |
| WO | 03079271 A1 | 9/2003 |

OTHER PUBLICATIONS

International Search Report and Written Opinion of PCT/US2016/066281 dated Mar. 6, 2017.

* cited by examiner

SYSTEMS AND METHODS FOR MINIMIZING OBSTRUCTION OF A MEDIA ASSET BY AN OVERLAY BY PREDICTING A PATH OF MOVEMENT OF AN OBJECT OF INTEREST OF THE MEDIA ASSET AND AVOIDING PLACEMENT OF THE OVERLAY IN THE PATH OF MOVEMENT

CROSS-REFERENCE TO RELATED APPLICATIONS

This application is a continuation application of U.S. patent application Ser. No. 16/466,758, filed Jun. 5, 2019, which is a national stage application under 35 U.S.C. § 371 of International Application PCT/US2016/066281, filed Dec. 13, 2016. The disclosure of which is hereby incorporated by reference herein in its entirety.

BACKGROUND

Overlays and other forms of secondary content are often provided over media assets to convey notifications to the user, such as a notification of a call to one's home, or a notification relating to media one is consuming. Such overlays may be disruptive, as an overlay may block an object of interest within a media asset one is viewing. In the related art, important, static objects are identified, and placement of an overlay is performed in a manner that avoids those static objects. However, the related art does not predict where non-static objects may be moving toward, and thus may still result in placement of an overlay that is disruptive to a user's enjoyment of media.

SUMMARY

To this end and others, systems and methods are provided herein for minimizing obstruction of a media asset by an overlay by predicting a path of movement of an object of interest of the media asset and avoiding placement of the overlay in the path of movement. For example, if a soccer ball is the object of interest, and the soccer ball is traveling from the left side of the field to the right side of the field, placement of an overlay on top of the right side of the field may be avoided so that the overlay does not become disruptive as the ball progresses across the field.

In some aspects of the disclosure, a media guidance application may detect an object of interest in a first frame of a media asset. The object of interest may be detected in any known manner, such as by using metadata that reflects what the object of interest is, using image recognition software and auxiliary information to determine what the object of interest is, determining which object is in the foreground of a frame, or any other manner.

In some embodiments, the media guidance application may determine a first location of the object of interest in the first frame, and may determine a second location of the object of interest in a second frame of the media asset. Following from the soccer example, the media guidance application may determine the location with respect to a feature of the frame (e.g., is the ball on the left side of the field or the right side of the field?). Alternatively, the media guidance application may determine the location with respect to coordinates of the image itself (e.g., is the ball in the top left quadrant of the frame or the top right quadrant of the frame?).

In some embodiments, the media guidance application may calculate, based on the first location and the second location, a projected location of the object of interest in a third frame of the media asset. As an example, the media guidance application may perform this calculation by first determining an amount of content that is to be included in the overlay. The amount of content may vary depending on whether the overlay is a short communication (e.g., a notification of a telephone number, or of a short message from one user to another), or some larger amount of information (e.g., a trailer for a movie that requires half of a screen).

The media guidance application may then determine, based on information of a user profile (e.g., a profile of the user consuming the media asset), a first amount of time the user will require to consume the content of the overlay. For example, the media guidance application may determine that the user profile reflects that the user is a slow reader, and thus a user may take a fill 10 seconds to read a five word notification.

The media guidance application may also determine a second amount of time that will lapse before the object of interest reaches the projected location (e.g., based on a velocity of the object), and may, in response to determining that the second amount of time exceeds the first amount of time, generate for display the overlay on top of the media asset at the projected location for a period of time that is less than the second amount of time. For example, if the message will take up a quadrant of the screen, and a soccer ball will not reach the top right quadrant of the screen before the user will finish consuming the content of the overlay, the overlay may be generated for display on top of the top right quadrant of the screen.

In some embodiments, the media guidance application may generate for display an overlay on top of the media asset in a location that does not overlap with any of the first location, the second location, and the projected location. For example, the overlay may be placed in a manner that entirely avoids the path of a soccer ball, or of a player who is chasing the soccer ball.

In some embodiments, the media guidance application may determine a size of the overlay (e.g., by determining the boundaries of the overlay). The media guidance application may identify a region in the second frame corresponding to the size of the overlay that is unchanged in the second frame as compared to the first frame. For example, the media guidance application may determine that neither a player nor a ball of a sporting match are in the top left quadrant of both frames, and thus the top left quadrant has been vacant over a period of time. The media guidance application may go on to determine whether the region overlaps with any of the first location, the second location, and the projected location (e.g., that neither a player nor the ball are traveling toward the top left quadrant of the screen). The media guidance application may perform the generating for display of the overlay in response to determining that the region does not overlap with any of the first location, the second location, and the projected location, and may cause the overlay to generated for display on top of the media asset within the region (e.g., because there is no chance the overlay will be on top of any meaningful portion of the sporting event because no person or object of interest is, or will be, within the region).

In some embodiments, the media guidance application may determine that the object of interest is not in the projected location of the third frame. For example, if the object of interest is a soccer player, and the media guidance application projected that the soccer player would be in the top left quadrant of the screen, but the soccer player is not in the top left quadrant of the screen, the media guidance application would determine that the object of interest is not in the projected location of the third frame. In response to determining that the object of interest is not in the projected location of the third frame, the media guidance application may cease the generating for display of the overlay on top of the media asset (e.g., in order to ensure that the overlay is not disruptive because the object of interest is potentially beneath the overlay).

In some embodiments, further in response to determining that the object of interest is not in the projected location of the third frame, the media guidance application may update a model used to calculate the projected location of the object of interest with data indicating that the calculation of the projected location of the object of interest has failed, and may determine, based on the updated model, an updated projected location of the object of interest in a fourth frame of the media asset. For example, new data about a player's movements in a sporting event may cause the media guidance application to change its projection about the player's future movement. Thus, the media guidance application may generate for display the overlay on top of the media asset in a location that does not overlap the updated projected location.

In some embodiments, the media guidance application may determine that the media asset is a live media asset broadcast (e.g., a broadcast over a television channel). The media guidance application may also determine that the media asset is of a certain type of a plurality of types (e.g., a sporting event, as opposed to a live broadcast of a concert). The media guidance application may thus detect the object of interest in the first frame by discerning the object of interest from a plurality of candidate objects of interest based on the certain type.

For example, in a concert, fans of a band that is playing may be throwing a giant beach ball around in the crowd, and in a soccer game, a soccer ball is kicked. The media guidance application may determine that the ball is not an object of interest in the concert because the primary purpose of the concert is presentation of music. However, the media guidance application may determine that the ball is an object of interest in the soccer match because the primary purpose of a soccer match is movement of a soccer ball. The media guidance application may calculate, based on the first location and the second location, the projected location of the object of interest in the third frame of the media asset based on both an identity of the object of interest and the certain type. For example, movement of a ball in a soccer ball may be regular, where the ball travels in a straight line path, whereas movement in a billiards match may be irregular, where a ball travels based on the many collisions it encounters along its path, which will cause the projection to change.

In some embodiments, the media guidance application may, when calculating, based on the first location and the second location, the projected location of the object of interest in the third frame of the media asset, compare the first location to the second location to determine a distance between the first location and the second location and a direction in which the media object is traveling. The media guidance application may also compare a time stamp of the first frame to a time stamp of the second frame to determine a time difference between the times at which the first frame and the second frame were broadcast. With this information, the media guidance application may determine a velocity of the object of interest based on the distance, the direction, and the time difference, and may also determine a projected time stamp of the third frame. The media guidance application may determine the projected location based on where the object of interest will be in the third frame if the velocity is substantially maintained (e.g., the velocity is maintained, minus natural loss in velocity due to natural forces such as friction).

In some embodiments, the media asset is a live broadcast of a sporting event, the object of interest is a person participating in the sporting event, and the first location and the second location are equal. The media guidance application may access a profile of the person (e.g., a statistics line corresponding to a sports player), and may determine, based on information of the profile, a preferred direction that the person tends to travel when participating in the sporting event. For example, if the media asset is an American football game, and a person often runs to his left, the media guidance application may form its projection of where the person will be in a next frame based on this information. Thus, the media guidance application may calculate the projected location of the object of interest in the third frame of the media asset further by basing the projected location on the preferred direction.

In some embodiments, the media asset is a live broadcast of a sporting event, and the object of interest is a ball. The media guidance application may detect, in a fourth frame of the media asset, a person at a third position, and may detect, in a fifth frame of the media asset, the person at a fourth position. The media guidance application may determine, based on movement of the person between the third position and the fourth position, that the person is likely to interact with the ball. For example, the media guidance application may determine that a player is rapidly approaching a soccer ball, and thus that the ball will imminently change direction. Thus, the media guidance application may calculate an updated projected position for a sixth frame of the media asset of the ball based on the movement of the person between the third position and the fourth position.

In some embodiments, the media guidance application may calculate the updated projected position for the sixth frame of the media asset of the ball based on the movement of the person between the third position and the fourth position by determining a first velocity of the person based on the third position, the fourth position, a time stamp of the fourth frame, and a time stamp of the fifth frame. The media guidance application may also determine a second velocity of the ball based on a location of the ball at in the fourth frame and the fifth frame. The media guidance application may calculate the updated projected position by combining the first velocity and the second velocity (e.g., the velocity of the ball before impacting with the player, as well as the velocity of the player before impacting with the ball).

In some embodiments, the media guidance application may detect an object of interest in a media asset. The media guidance application may determine a projected path of movement of the object of interest, and may generate for display an overlay on top of the media asset in a location that does not overlap with the path of movement.

DETAILED DESCRIPTION

Figure 1:
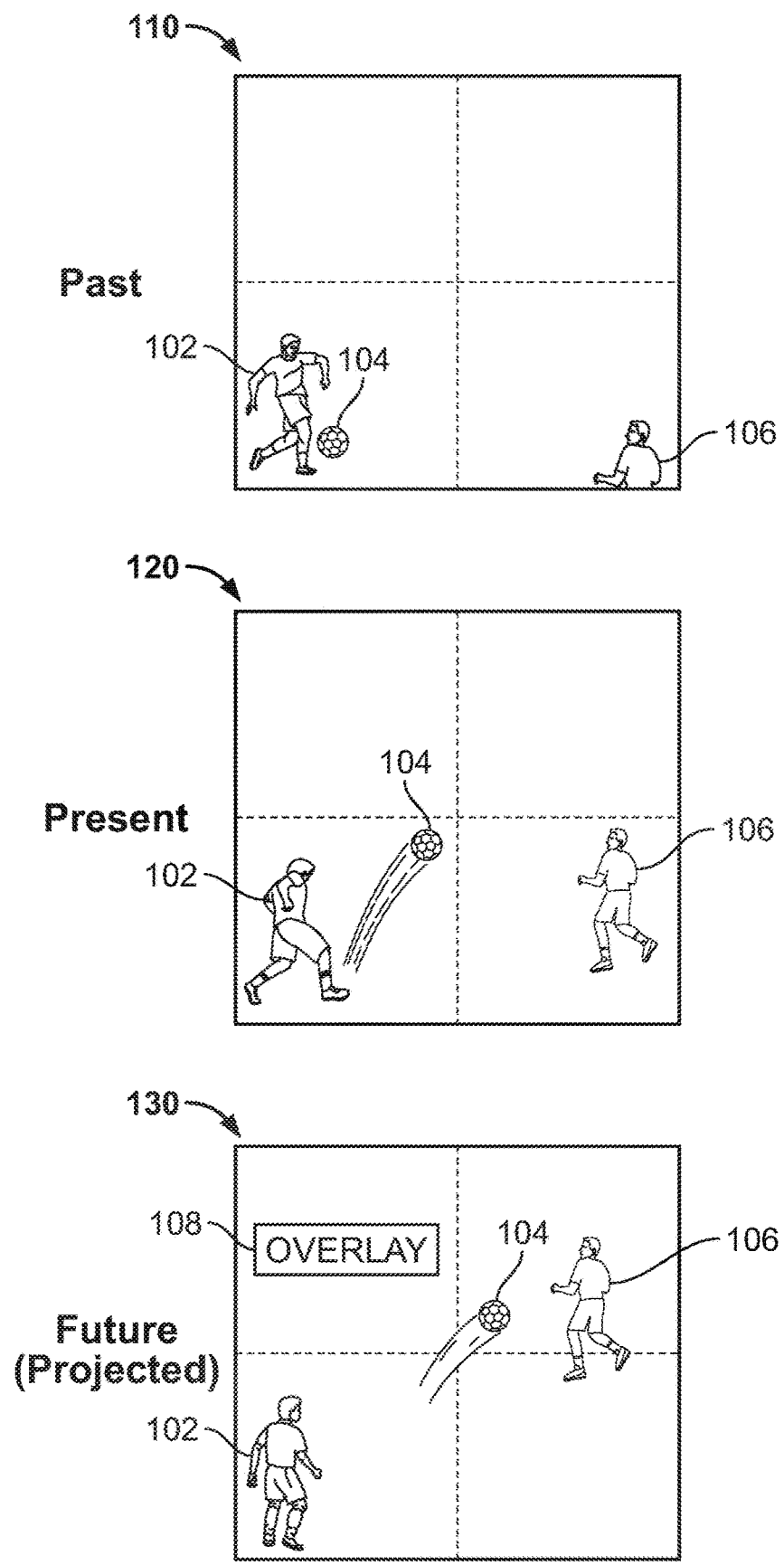
FIG. 1 depicts an illustrative embodiment of using a past frame and a present frame of a media asset to project a location of an object of interest in a future frame of the media asset, in accordance with some embodiments of the disclosure.

FIG. 1 depicts an illustrative embodiment of using a past frame and a present frame of a media asset to project a location of an object of interest in a future frame of the media asset. A media asset may include multiple frames, such as frame 110, frame 120, and frame 130. Frame 110 depicts a frame that was displayed by user equipment at a first time (e.g., in the past), frame 120 depicts a frame that is displayed by user equipment at a second time (e.g., at the present), and frame 130 depicts a frame that will be displayed by the user equipment at a third time (e.g., in the future).

As depicted, the media asset is a soccer match; however, the media asset may be any media asset, as defined below with respect to FIGS. 2-5. The media asset includes person 102, ball 104, and person 106, any or all of which may be an object of interest of the media asset. The use of persons and a ball is merely illustrative; the media asset could include any other entities, any of which may be an object of interest. As defined herein, the term "object of interest" is a living or non-living entity within a media asset that, if obscured, would cause a loss of enjoyment or understanding to a user consuming the media asset. For example, if a player were covered with an overlay while scoring a goal in a soccer match, a spectator would suffer a loss of enjoyment in consuming that soccer match. If, however, a player on the sidelines of the soccer match were covered by an overlay, a spectator would suffer no loss of enjoyment in consuming that soccer match because the covered player was not part of any important part of the displayed frame of the soccer match.

In some embodiments, a media guidance application may detect an object of interest in a first frame of a media asset. The media guidance application may be executed by control circuitry, which may be installed in either user equipment or a server remote to user equipment. Functionality of the media guidance application, control circuitry, various user equipment, and of a server, is described in detail below with respect to FIGS. 2-5. The media guidance application may detect the object of interest in any known manner. In some embodiments, the object of interest may be a foreground object. For example, if one object is prominently in the foreground of frame 110, or is centered in frame 110 or zoomed in on in frame 110, or is otherwise exaggerated (e.g., objects other than the object, such as person 102, are blurred), then that one object may be determined to be the object of interest.

In some embodiments, the media guidance application may employ facial recognition or object recognition to determine an identity of a person, character, and/or object in a frame (e.g., frame 110). For example, known techniques for determining facial characteristics or object characteristics may cause the media guidance application to determine that these characteristics match those of a known entity (e.g., by comparing the characteristics to characteristics of known entities stored in entries of a database).

The media guidance application may, after learning the identities of entities of a frame, compare those identities to metadata of a media asset, or of a portion of a media asset (e.g., a given frame or scene), to learn whether those identities are indicated by the metadata as being of particular interest to a given displayed frame. Based on this comparison, the media guidance application may determine that a given entity is an object of interest.

The media guidance application may, additionally or alternatively, use the type of media asset to determine whether a given known entity is an object of interest. For example, the media guidance application may determine an entity to be ball 104. The media guidance application may determine that the media asset within which ball 104 is presented is of a type "sports." The media guidance application may determine, by consulting a database, that a ball is extremely important to media assets of the type "sports," and may thus conclude that ball 104 is an object of interest. Similarly, if the media asset were of the type "music," the media guidance application may consult the database and learn that a ball is not important to media assets of the type "music," and may thus conclude that ball 104 is not an object of interest.

There are many other ways of determining that an entity of a frame of a media asset is an object of interest. For example, the media guidance application may receive an indication from a user expressly or impliedly stating that the object is of interest (e.g., the user exclaims out loud a platitude relating to the object, and the media guidance application detects the exclamation). Moreover, crowd-sourced data may indicate that an entity is of interest. Discussion of how the media guidance application may determine that an entity is of interest based on crowdsourced data is described in detail in U.S. patent application Ser. No. 15/165,061, filed May 26, 2016, currently pending, the contents of which are hereby incorporated by reference herein in their entirety. There may be more than one object of interest in a given frame of a media asset. In fact, in some embodiments, the media guidance application may determine that many or all of the objects in a given frame of a media asset are of interest.

In some embodiments, the media guidance application may determine a first location of the object of interest in the first frame, and may determine a second location of the object of interest in a second frame of the media asset. For example, assume that ball 104 is an object of interest. The media guidance application may determine a location of ball 104 in both frame 110 and subsequent frame 120. The media guidance application may determine the location using any reference point. For example, the media guidance application may determine the location with reference to the boundaries of frames 110 and 120, respectively, using a coordinate system (e.g., X and Y coordinates, or Z coordinates in a three-dimensional system). The media guidance application may use other reference points, such as coordinates of a field of play of a sporting match, or of any other bounded area. Less granular coordinates may be used, such as quadrants of a bounded area (e.g., as illustrated in frames 110, 120, and 130).

In some embodiments, the media guidance application may calculate, based on the first location and the second location, a projected location of the object of interest in a third frame of the media asset. For example, if the object of interest is ball 104, the media guidance application may compare the location of ball 104 in past frame 110, and present frame 120, in order to determine a vector representing the motion of ball 104. As depicted in FIG. 1, ball 104 has moved up and to the right in frame 120, relative to frame 110. Thus, a vector pointing up and to the right represents the direction in which ball 104 is traveling. The projected location of ball 104 may therefore be calculated on the basis of this direction.

In some embodiments, the media guidance application may also calculate a speed at which the object of interest is traveling. For example, the media guidance application may determine how much time has lapsed between the activity of frame 120, and the activity of frame 110. The media guidance application may determine the time lapse using time stamps associated with frame 110 and frame 120 (e.g., as embedded in metadata associated with frame 110 and frame 120). Alternatively, the media guidance application may determine the time lapse by, in real time, calculating an amount of time that lapsed between a display of frame 110 and a display of frame 120. Any other mechanism of determining a time lapse may be used by the media guidance application to determine the time lapse.

The media guidance application, in addition to determining the time lapse, may also determine the distance the object of interest (e.g., ball 104) traveled (e.g., between frame 110 and frame 120), in order to determine the speed. As an example, in order to calculate the distance that ball 104 has traveled, the media guidance application may calculate the coordinates of ball 104 in frame 110 as well as the coordinates of ball 104 in frame 120, and then may calculate the distance based on a comparison of the respective coordinates. The coordinates of ball 104 may be determined with reference to any bounded space. For example, the media guidance application may determine the coordinates on an x-y (or x-y-z, if the media asset is a three-dimensional media asset) axis with respect to the boundaries of a given frame (e.g., frame 110 and frame 120). Other bounded spaces may be used to determine the distance ball 104 traveled. For example, coordinates may be determined with reference to a soccer field to determine how far ball 104 has traveled, or with reference to any other bounded space.

The media guidance application may determine the speed of ball 104 on the basis of the calculated time taken, and distance covered, by ball 104 between frames 110 and 120. The media guidance application may additionally calculate the velocity of ball 104 by considering the direction traveled by ball 104 in conjunction with the speed of ball 104. With information about the velocity of ball 104, the media guidance application may project a position at which ball 104 may arrive at a future frame (e.g., frame 130). The media guidance application may project the position by determining a time lapse between frame 120 and a frame for which a prediction is being made (e.g., frame 130) will be displayed, and then applying the calculated velocity to that time lapse. As an example, as depicted in FIG. 1, the media guidance application may project that in frame 130, ball 104 will travel to the top right quadrant of the screen based on the velocity of ball 104 at frame 120, and the time stamp difference between the time stamp of frame 130 and frame 120.

The media guidance application may improve the accuracy of the calculation of the projected location of ball 104 (or any other object of interest) using additional data. For example, if additional frames were considered beyond frame 120 and frame 110, the media guidance application could determine whether the speed of ball 104 slowed down or sped up relative to the speed of ball 104 as calculated from other frames (e.g., because friction from the grass caused ball 104 to gradually slow down). Using this information, the media guidance application could determine an acceleration or deceleration of ball 104, and adjust the projected location of ball 104 at a given frame accordingly.

In some embodiments, the media guidance application may determine that the projected movement of the object of interest is likely to be interfered with. For example, the media guidance application may determine that player 106 is rapidly approaching ball 104, and thus that ball 104 will imminently change direction. Thus, the media guidance application may calculate an updated projected position for ball 104 on the basis of the expected interference. The media guidance application may calculate the updated path of ball 104 by determining a velocity of person 106 in the same manner as described above with respect to ball 104. The media guidance application may then calculate an updated projected path of ball 104 by combining the velocities of ball 104 and person 106 to arrive at a resultant velocity.

In some embodiments, the media guidance application may generate for display an overlay (e.g., overlay 108) on top of the media asset in a location that does not overlap with any of the first location, the second location, and the projected location. For example, the overlay may be placed in a manner that entirely avoids the path of a ball 104, or of a player who is chasing ball 104 (e.g., person 106). The path of person 106 (i.e., a set of projected locations for person 106 at different times of the media asset) may be calculated in the same manner as the path of ball 104.

In some embodiments, in order to ensure that overlay 108 will not obscure an object of interest, the media guidance application may determine a size of overlay 108 (e.g., by determining the boundaries of the overlay). The size over overlay 108 may be determined based on metadata associated with overlay 108 that defines the characteristics of overlay 108 that are to be generated for display. The media guidance application may determine, based on the size of overlay 108, an amount of a given frame that will be obscured by overlay 108.

The media guidance application may then identify regions that will not obscure an object of interest. To this end, the media guidance application may determine a region of frame 130 through which the object of interest will not travel on its projected path. Looking at FIG. 1, if ball 104 is the object of interest, ball 104 will not travel through the top left quadrant of frame 130 based on the projected path of ball 104. Thus, the media guidance application may determine to generate overlay 108 in the top left quadrant of frame 130. If there are multiple objects of interest in a given frame (e.g., person 102, ball 104, and person 106), the media guidance application may identify a location that will fit overlay 108 that does not include any of person 102, ball 104, and person 106.

In some embodiments, the media guidance application may identify a region in the second frame corresponding to the size of the overlay that is unchanged in the second frame as compared to the first frame. For example, even if person 106 is not an object of interest, a viewer's enjoyment of the media asset may be maximized if person 106 is not obscured. Thus, the media guidance application may determine that neither a player nor a ball of a sporting match are in the top left quadrant of both frame 110 and frame 120, and that there has been no movement in the top left quadrant of both frames, and thus the top left quadrant has been vacant over a period of time. The media guidance application may perform the generating for display of overlay 108 in response to determining that the region does not overlap with any moving object.

In some embodiments, the media guidance application may determine where to place overlay 108 on frame 130 based on how long overlay 108 is to be generated for display. For example, if overlay 108 includes a short message that is to be displayed for only two seconds, and it will take ball 104 three seconds to travel to a location in which overlay 108 is to be displayed, then there will be no loss of enjoyment notwithstanding that overlay 108 is on the projected path of the movement of ball 108.

In some embodiments, the amount of time to generate for display overlay 108 on top of frame 130 may be preprogrammed, and thus the media guidance application may determine this amount of time from express instructions. In some embodiments, the media guidance application may calculate how long overlay 108 is to be generated for display. The media guidance application may perform this calculation by first determining an amount of content (e.g., amount of text, amount of images, length of embedded video in overlay, etc.) that is to be included in the overlay. Based on the amount of content, the media guidance application may determine how much time overlay 108 is to be generated for display. In some embodiments, overlay 108 may be a video of a predefined length, and thus the amount of time overlay 108 is to be generated for display over frame 130 may be calculated to be equal to (or substantially equal to) that predefined length.

In some embodiments, such as when overlay 108 includes textual data, such as a text message, a social media update, news, or other textual data, the media guidance application may determine a length of time overlay 108 is to be generated for display based on how quickly a user will consume the content of overlay 108. The media guidance application may determine, based on information of a user profile (e.g., a profile of the user consuming the media asset), a first amount of time the user will require to consume the content of the overlay. For example, the media guidance application may determine that the user profile reflects a speed at which the user reads (e.g., based on how quickly the user has consumed other textual data). The media guidance application may, based on the amount of textual content that is to be generated for display in overlay 108, and based on the information of the user profile, thereby calculate how long the user will take to consume the content of overlay 108.

The media guidance application may also determine a second amount of time that will lapse before the object of interest reaches the projected location (e.g., in the same manner described above), and may, in response to determining that the second that the user will consume the content of overlay 108 before ball 104 reaches overlay 108, generate for display the overlay on top of the media asset at the projected location for a period of time that is less than the time projected for ball 104 to reach overlay 108.

In some embodiments, the media guidance application may determine that the object of interest is not in the projected location of the third frame. For example, if the object of interest is person 106, and the media guidance application projected that person 106 would be in the top left quadrant of frame 130, but person 106 is not in the top left quadrant of frame 130, the media guidance application would determine that the object of interest is not in the projected location of the third frame. In response to determining that the object of interest is not in the projected location of the third frame, the media guidance application may cease the generating for display of overlay 108 in order to ensure that the overlay is not disruptive, as the object of interest is potentially beneath the overlay. Alternatively, the media guidance application, in response to determining that the object of interest is not in the projected location of the third frame, may determine whether overlay 108 is obstructing viewing of person 106 (and/or any other moving object or object of interest), and may limit ceasing the generating for display of overlay 108 to a condition where the overlay is obstructing viewing of person 106 (and/or any other moving object or object of interest).

Following from the above, if the media guidance application detects that the projected location of an object of interest is incorrect, the media guidance application may update a model used to calculate the projected location of the object of interest with data indicating that the calculation of the projected location of the object of interest has failed, and may determine, based on the updated model, an updated projected location of the object of interest in a fourth frame of the media asset. For example, new data about a player's movements in a sporting event may cause the media guidance application to change its projection about the player's future movement. Thus, the media guidance application may generate for display overlay 108 on the basis of an updated projected location of an object of interest.

In some embodiments, the media asset is a live broadcast of a sporting event, the object of interest is a person participating in the sporting event, and the first location and the second location are equal. For example, in a game of American football, a player may not move between frames because the players are supposed to stand still until a play begins, and the play may not yet have begun. The media guidance application may access a profile of, e.g., person 102 (e.g., a statistics line corresponding to a sports player), and may determine, based on information of the profile, a preferred direction that person 102 tends to travel when participating in the sporting event. For example, if the media guidance application determines that person 102 plays the position of running back in American football, and the media guidance application determines based on statistics of the profile of person 102 that person 102 runs to his left on over 90% of plays, the media guidance application may form its projection of where the person will be in a next frame based on this information. Thus, the media guidance application may generate for display overlay 108 in frame 130 on the right side of frame 130 in order to avoid a likely overlap with person 102 if overlay 108 were to be generated for display on top of the left side of frame 130.

In some embodiments, the media guidance application may determine that the user is highly engaged in a media asset. The media guidance application may responsively refrain from generating for display overlay 108 until the user's interest dips below a threshold. Determining levels of engagement of a user is discussed in U.S. patent application Ser. No. 15/333,911, filed Oct. 25, 2016, the disclosure of which is hereby incorporated by reference herein in its entirety. In some embodiments, the media guidance application may determine whether overlay 108 is of a high importance (e.g., whether overlay 108 is signaling an emergency, versus whether overlay 108 is a simple incoming e-mail notification). In response to determining that overlay 108 is of high importance, the media guidance application may generate for display overlay 108 on top of the media asset notwithstanding the user's high level of interest in the media asset. In other embodiments, the media guidance application may determine that the user has been highly interested in the media asset for a threshold period of time, and may responsively generate for display overlay 108 on top of the media asset notwithstanding that the user is highly interested in the media asset.

In some embodiments, the media guidance application may determine that overlay 108 cannot be generated for display on top of the media asset without obstructing an object of interest of the media asset. In response, the media guidance application may generate for display the content of overlay 108 on a secondary device (e.g., a user's tablet or mobile phone) in order to avoid obstructing the objects of interest. In some embodiments, the media guidance application may additionally or alternatively simply use a signal (e.g., a colored blink or reduced size overlay 108) to alert the user to the fact that a message is incoming, and allow the user to proactively cause overlay 108 to be generated for display at a convenient time that will not obstruct the media asset.

In some embodiments, the media guidance application may determine that the object of interest is inappropriate for viewing by children (e.g., a nude woman). The media guidance application may refrain from generating for display overlay 108 until such a time that a child enters the room, and may responsively generate for display overlay 108 on top of the object of interest in order to obscure the object of interest from the view of the child.

In some embodiments, the media guidance application may cause the contents of overlay 108 to relate to the media asset. For example, if the media asset is a soccer match in London, the media guidance application may generate for display overlay 108 with content relating to London, such information about a restaurant in London that the user would enjoy eating at.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
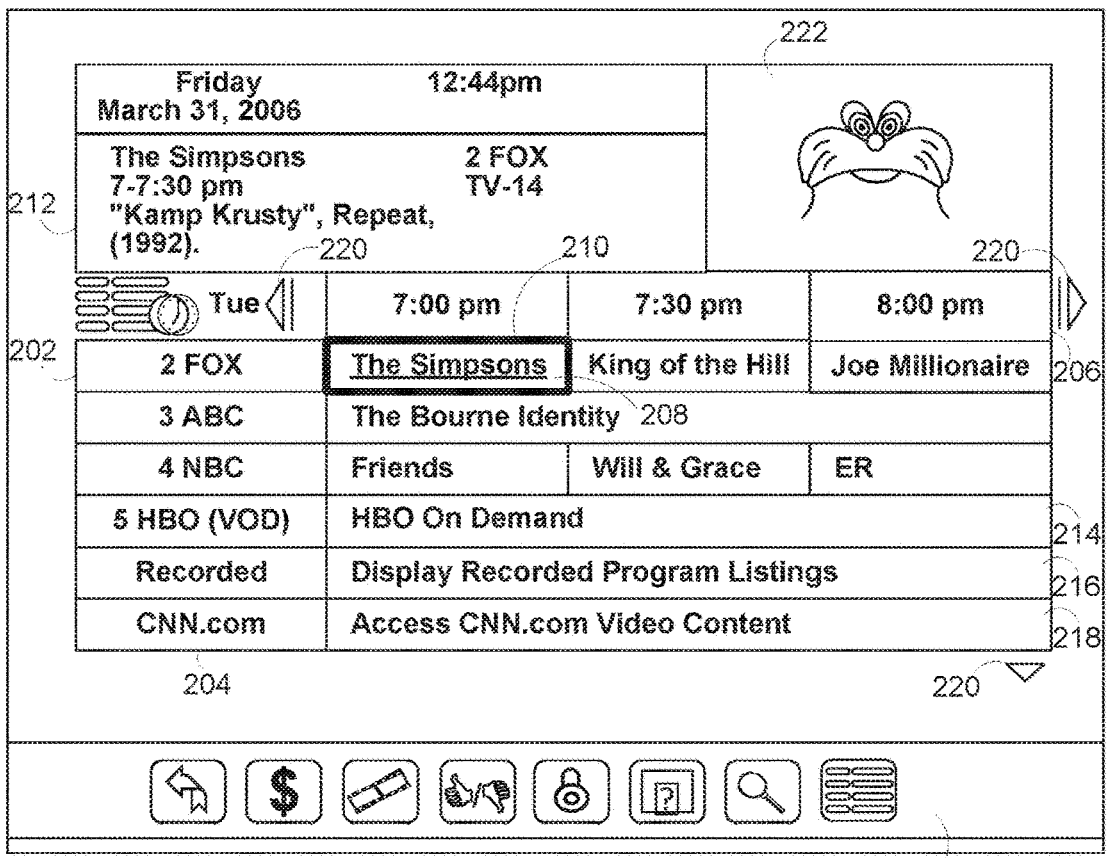
FIG. 2 shows an illustrative embodiment of a display screen that may be used to provide media guidance application listings and other media guidance information, in accordance with some embodiments of the disclosure.
Figure 3:
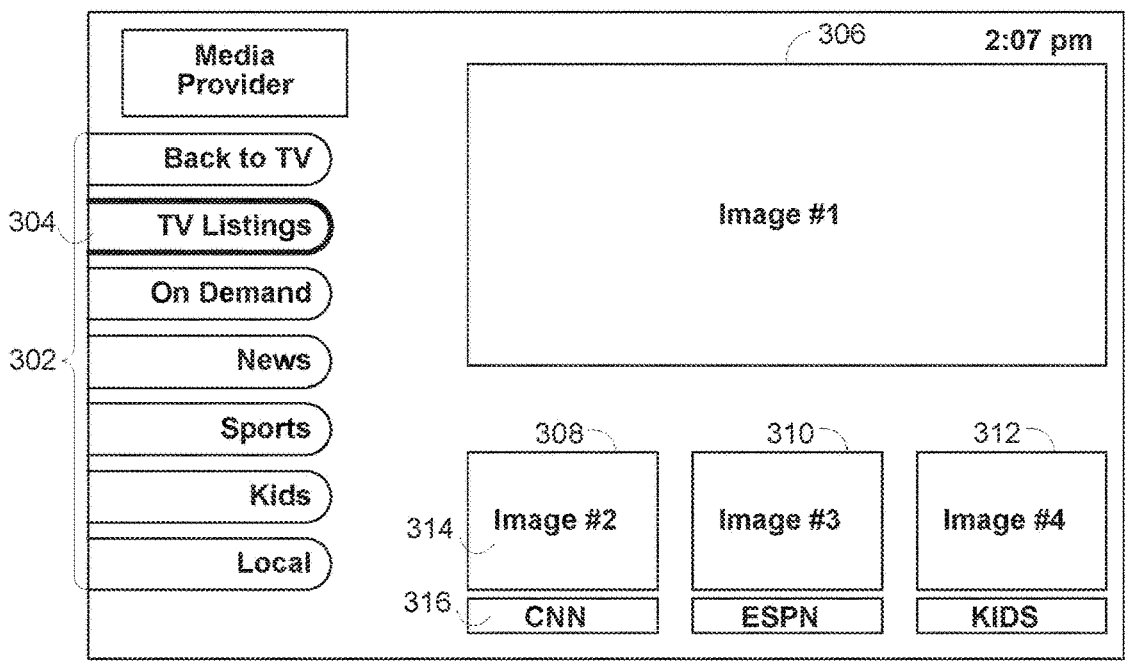
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title,, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, advertisement 224, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 224 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 202. Advertisement 224 may also be for products or services related or unrelated to the content displayed in grid 202. Advertisement 224 may be selectable and provide further information about content, provide information about a product or a service, enable purchasing of content, a product, or a service, provide content relating to the advertisement, etc. Advertisement 224 may be targeted based on a user's profile/preferences, monitored user activity, the type of display provided, or on other suitable targeted advertisement bases.

While advertisement 224 is shown as rectangular or banner shaped, advertisements may be provided in any suitable size, shape, and location in a guidance application display. For example, advertisement 224 may be provided as a rectangular shape that is horizontally adjacent to grid 202. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other ty pes of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
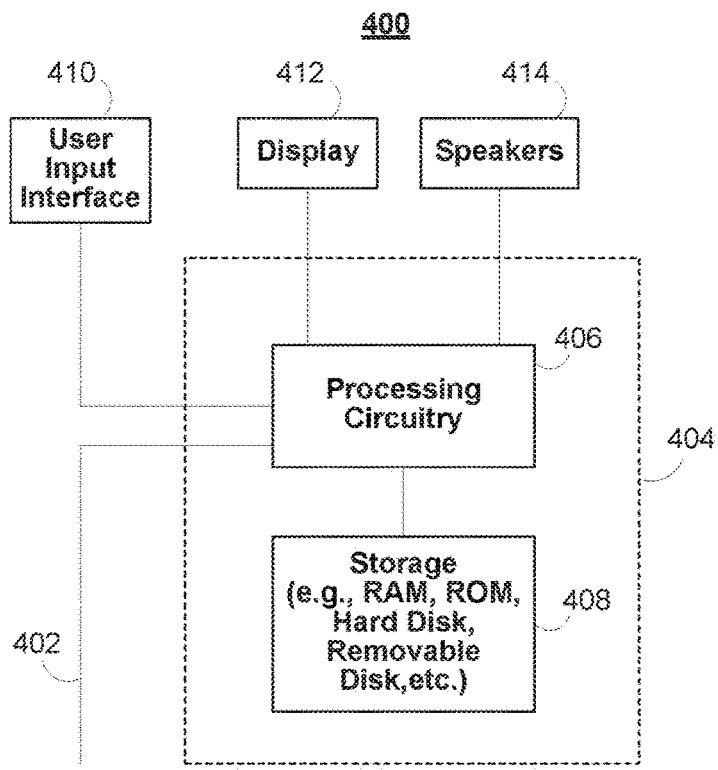
FIG. 4 is a block diagram of an illustrative user equipment (UE) device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
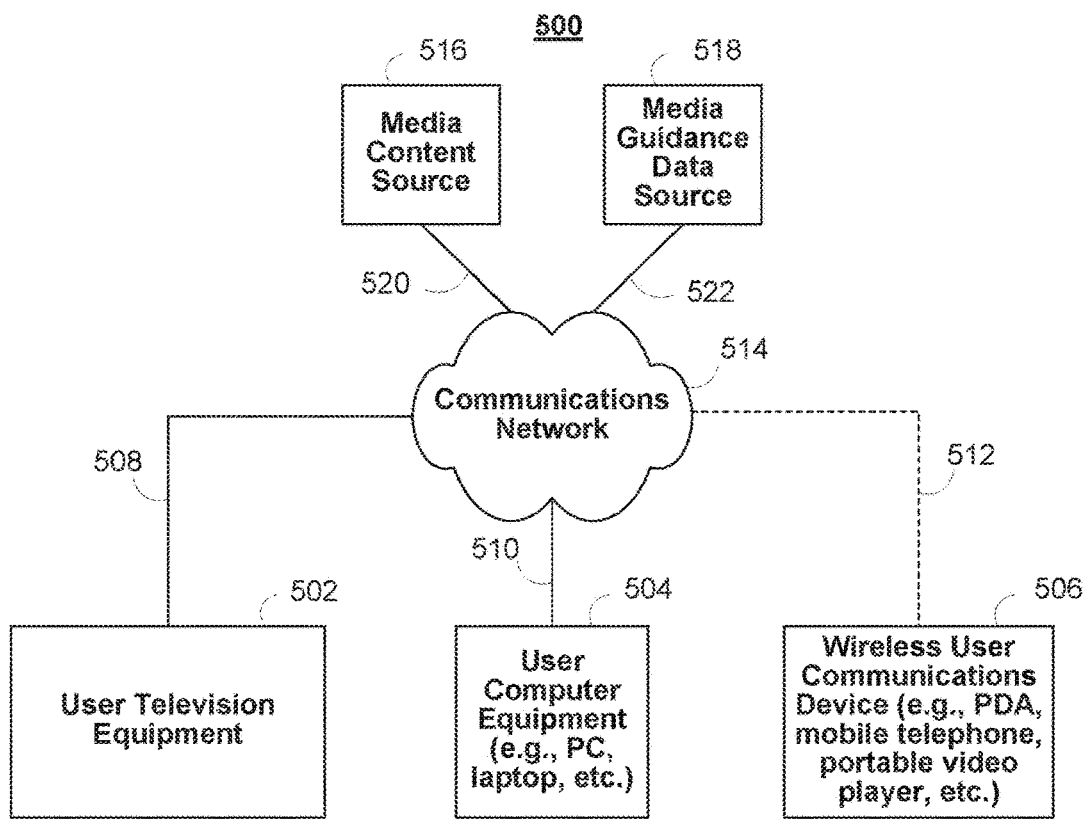
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some user television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 524 may be configured to maintain user information including advertisement-suitability scores associated with user in order to provide targeted advertising. Additionally or alternatively, a server associated with advertisement source 524 may be configured to store raw information that may be used to derive advertisement-suitability scores. In some embodiments, advertisement source 524 may transmit a request to another device for the raw information and calculate the advertisement-suitability scores. Advertisement source 524 may update advertisement-suitability scores for specific users (e.g., first subset, second subset, or third subset of users) and transmit an advertisement of the target product to appropriate users.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g. continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
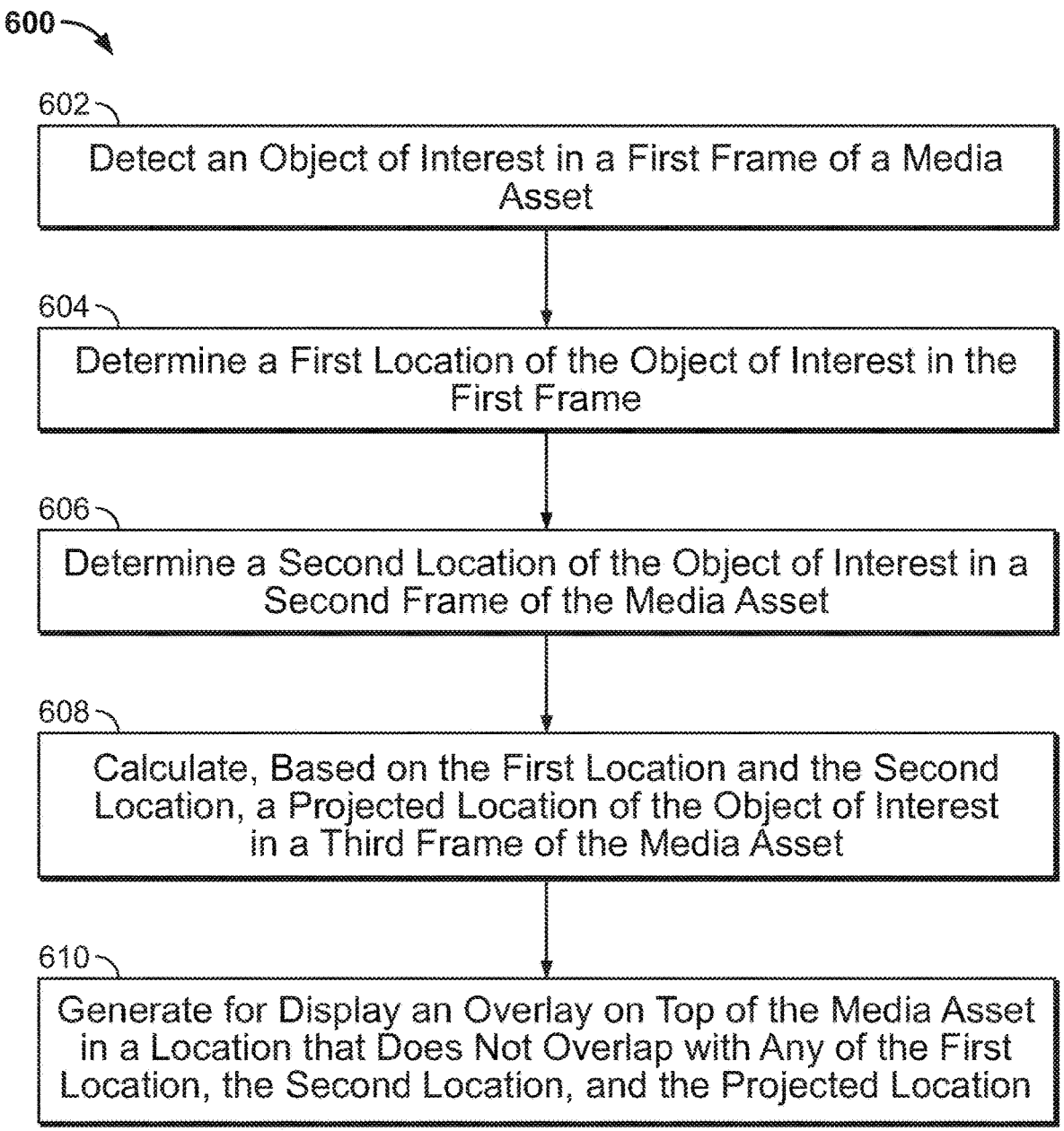
FIG. 6 depicts an illustrative flowchart of a process for generating for display an overlay on top of a media asset that does not obscure an object of interest of a given frame of the media asset, in accordance with some embodiments of the disclosure.

FIG. 6 depicts an illustrative flowchart of a process for generating for display an overlay on top of a media asset that does not obscure an object of interest of a given frame of the media asset, in accordance with some embodiments of the disclosure. Process 600 of FIG. 6 may be executed by control circuitry 404, as commanded by media guidance application based on functionality of the media guidance application described above. Control circuitry 404 may be implemented local to user equipment that generates for display frame 110, frame 120, and frame 130, or remote from the user equipment (e.g., at a server accessible by way of communications network 514). The user equipment may include any or all of the functionality of user television equipment 502, user computer equipment 504, and/or wireless user communications device 506.

Process 600 begins at 602, where control circuitry 404 may detect an object of interest (e.g., person 102, ball 104, and/or person 106) in a first frame (e.g., frame 110) of a media asset. For example, person 102 may be determined to be an object of interest based on any combination of facial recognition, metadata associated with frame 110, and the like. Manners in which control circuitry 404 may detect an object of interest are described in detail with reference to FIG. 1, and equally apply to 602.

Process 600 continues to 604, where control circuitry 404 may determine a first location of the object of interest in the first frame (e.g., bottom-left quadrant of frame 110). At 606, the control circuitry may also determine a second location of the object of interest (e.g., person 102) in a second frame of the media asset (e.g., frame 120). Manners in which control circuitry 404 may determine the location of an object of interest in any of frames 110 and 120 are described in detail with reference to FIG. 1, and equally apply to 604 and 606.

At 608, control circuitry 404 may calculate, based on the first location and the second location, a projected location of the object of interest in a third frame of the media asset. Manners in which the projected location may be calculated are discussed in detail with reference to FIG. 1 above, and equally apply to 608. Moreover, processes 700 and 800, described below, further detail manners in which the projected location may be calculated. At 610, control circuitry 404 may generate for display an overlay on top of the media asset in a location that does not overlap with any of the first location, the second location, and the projected location.

Figure 7:
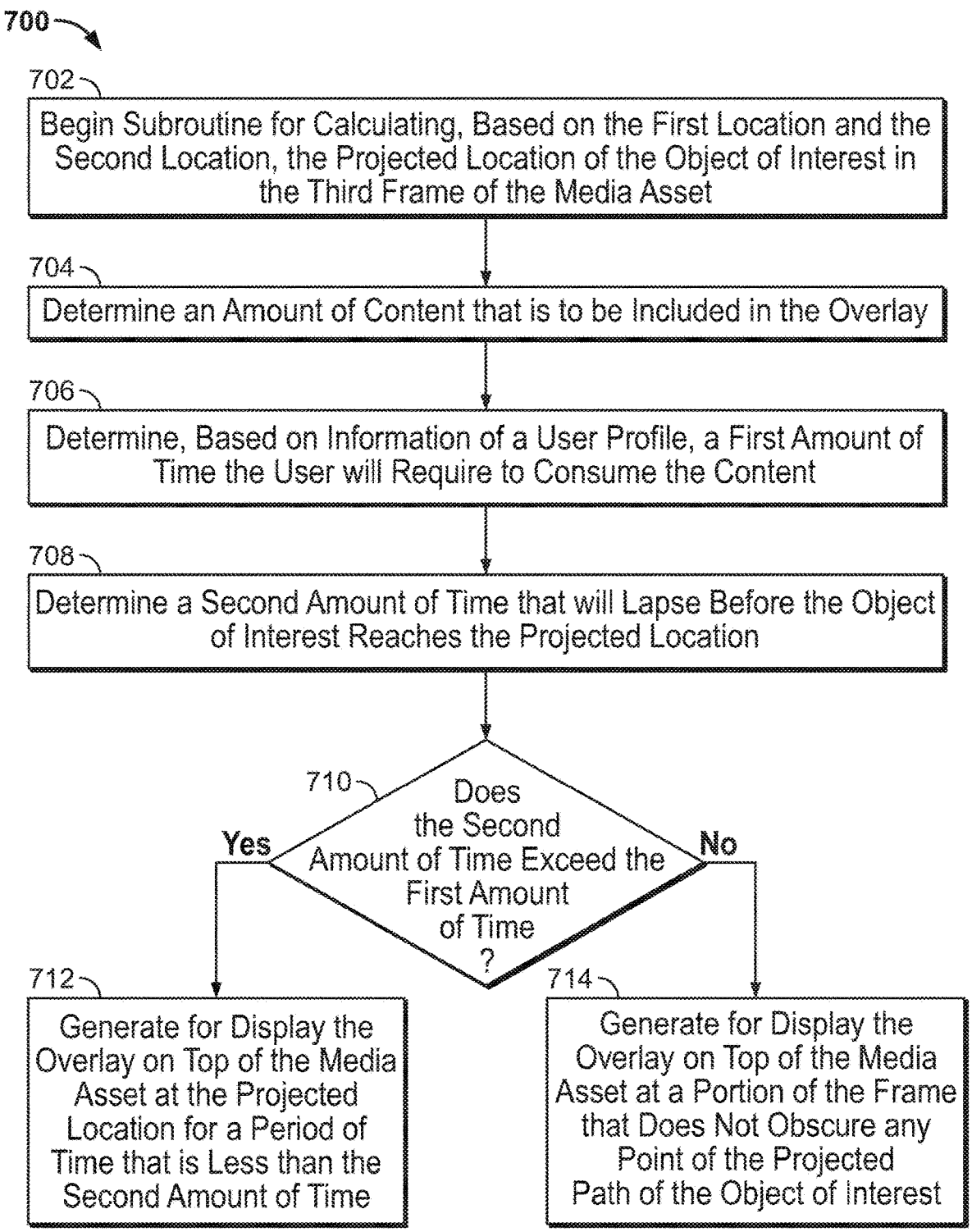
FIG. 7 depicts an illustrative flowchart of a process for calculating a projected location of the object of interest in a future frame of the media asset, in accordance with some embodiments of the disclosure.

FIG. 7 depicts an illustrative flowchart of a process for calculating a projected location of the object of interest in a future frame of the media asset, in accordance with some embodiments of the disclosure. Process 700 of FIG. 7 may be executed by control circuitry 404, as commanded by media guidance application based on functionality of the media guidance application described above. Control circuitry 404 may be implemented local to user equipment that generates for display frame 110, frame 120, and frame 130, or remote from the user equipment (e.g., at a server accessible by way of communications network 514). The user equipment may include any or all of the functionality of user television equipment 502, user computer equipment 504, and/or wireless user communications device 506.

Process 700 begins at 702, where control circuitry 404 may begin a subroutine for calculating, based on the first location and the second location, the projected location of the object of interest in the third frame of the media asset. For example, 702 may be a subroutine for executing 608 of process 600.

At 704, control circuitry 404 may determine an amount of content that is to be included in the overlay (e.g., overlay 108). For example, as described above, overlay 108 may have little content (e.g., an incoming telephone call notification), or a high volume of content (e.g., a trailer for a movie, or a long e-mail). Manners in which control circuitry 404 may determine the amount of content to be included in overlay 108 are described in detail above with respect to FIG. 1, and apply equally to 704.

Process 700 may continue to 706, where control circuitry 404 may determine, based on information of a user profile, a first amount of time the user will require to consume the content. For example, control circuitry 404 may determine that a user reads at a speed of ten words per minute, and may thus calculate how many words are to be included in overlay 108 and determine therefrom how long it will take the user to consume the content of overlay 108. Other manners in which control circuitry 404 may determine the first amount of time are described in detail above with respect to FIG. 1, and apply equally to 706.

At 708, control circuitry 404 may determine a second amount of time that will lapse before the object of interest (e.g., ball 104) reaches the projected location. For example, as will be described below with respect to process 800, the amount of time for ball 104 to reach the projected location may be calculated based on the velocity of ball 104. Manners in which the second amount of time may be determined are described in detail above with respect to FIG. 1, and apply equally to 708.

At 710, control circuitry 404 may determine whether the second amount of time exceeds the first amount of time (e.g. will ball 104 take longer to reach the projected location than the user will require to consume the content of overlay 108?). If the second time does exceed the first time, process 700 continues to 712, where control circuitry 404 may generate for display the overlay on top of the media asset at the projected location for a period of time that is less than the second amount of time (e.g., a period of time long enough for the user to read the contents of overlay 108, but not so long that when ball 104 reaches the projected location, overlay 108 will obscure ball 104). If the second time does not exceed the second time, control circuitry 404 may generate for display the overlay on top of the media asset at a portion of the frame that does not obscure any point of the projected path of the object of interest.

Figure 8:
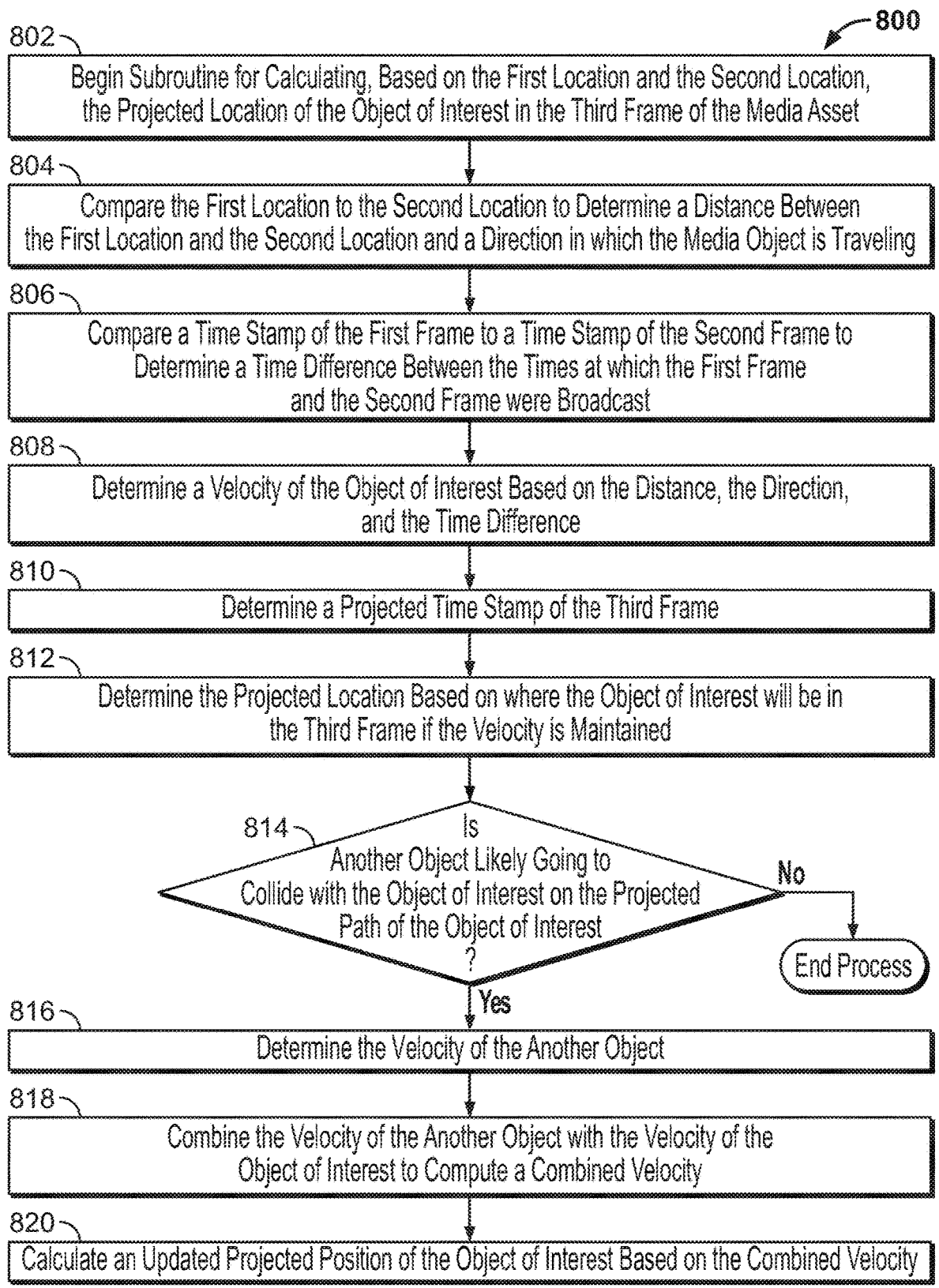
FIG. 8 depicts an illustrative flowchart of a process for calculating a projected location of the object of interest based on a velocity of the object of interest, in accordance with some embodiments of the disclosure.

FIG. 8 depicts an illustrative flowchart of a process for calculating a projected location of the object of interest based on a velocity of the object of interest, in accordance with some embodiments of the disclosure. Process 800 of FIG. 8 may be executed by control circuitry 404, as commanded by media guidance application based on functionality of the media guidance application described above. Control circuitry 404 may be implemented local to user equipment that generates for display frame 110, frame 120, and frame 130, or remote from the user equipment (e.g., at a server accessible by way of communications network 514). The user equipment may include any or all of the functionality of user television equipment 502, user computer equipment 504, and/or wireless user communications device 506.

At 802, control circuitry 404 may begin a subroutine for calculating, based on the first location and the second location, the projected location of the object of interest in the third frame of the media asset. For example, 802 may be a subroutine for executing 608 of process 600.

At 804, control circuitry 404 may compare the first location to the second location to determine a distance between the first location and the second location and a direction in which the media object is traveling. For example, as described with respect to FIG. 1 above, control circuitry 404 may calculate a vector representing both distance and direction between the first location and the second location.

At 806, control circuitry 404 may compare a time stamp of the first frame (e.g., frame 110) to a time stamp of the second frame to determine a time difference between the times at which the first frame and the second frame (e.g., frame 120) were broadcast. At 808, control circuitry 404 may determine a velocity of the object of interest based on the distance, the direction, and the time difference. For example, control circuitry 404 may calculate a speed by dividing the distance by the time, and may append the direction to the speed to form the velocity. Manners of calculating distance, direction, and velocity are described above with respect to FIG. 1 and equally apply to 804, 806, and 808.

At 810, control circuitry 404 determines a projected time stamp of the third frame (e.g., a time when frame 130 will be generated for display). At 812, control circuitry 404 determines the projected location based on where the object of interest will be in the third frame if the velocity is substantially maintained (e.g., velocity is maintained, minus loss in velocity due to natural forces such as friction). For example, as discussed in detail above with respect to FIG. 1, control circuitry 404 may use the velocity of ball 104 to determine at a future time how far ball 104 will travel if its projected path is maintained.

Optionally, process 800 continues to 814. At 814, control circuitry 404 determines whether another object (e.g., person 106) is likely going to collide with the object of interest on the projected path of the object of interest. Process 800 ends if control circuitry 404 determines that another object is not likely to collide with the object of interest. If control circuitry 404 determines that another object is likely to collide with the object of interest, process 800 continues to 816.

At 816, control circuitry 404 determines the velocity of the another object (e.g., person 106). At 818, control circuitry 404 combines the velocity of the another object with the velocity of the object of interest to compute a combined velocity. For example, the velocity of ball 104 and the velocity of person 106 may be combined to compete a combined velocity (e.g., a new speed in the direction of the top left quadrant of frame 120 based on the velocity of person 106 being in the direction of the top-left quadrant of frame 120). At 820, control circuitry 404 may calculate an updated projected position of the object of interest based on the combined velocity. Manners of calculating the updated projected position of the object of interest are described in detail with respect to FIG. 1 and apply equally to 816, 818, and 820.

It should be noted that processes 600-800 or any step thereof could be performed on, or provided by, any of the devices shown in FIGS. 1 and 4-5. For example, any of processes 600-800 may be executed by control circuitry 404 (FIG. 4) as instructed by control circuitry implemented on user equipment 502, 504, 506 (FIG. 5), and/or a user equipment for selecting a recommendation. In addition, one or more steps of processes 600-800 may be incorporated into or combined with one or more steps of any other process or embodiment.

It is contemplated that the steps or descriptions of each of FIGS. 6-8 may be used with any other embodiment of this disclosure. In addition, the steps and descriptions described in relation to FIGS. 6-8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-8.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, calculating a velocity of an object of interest may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, a type of media asset, as described herein, may be stored in, and retrieved from, storage 408 of FIG. 4, or media guidance data source 518 of FIG. 5. Furthermore, processing circuitry, or a computer program, may update settings, such as settings associated with overlay 108, stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method comprising:
   detecting an object of interest in a first frame of a media asset;
   determining a first location of the object of interest in the first frame;
   determining a second location of the object of interest in a second frame of the media asset;
   calculating, based on the first location and the second location, a projected location of the object of interest in a third frame of the media asset that is displayed after the first frame and the second frame;
   determining an amount of content that is to be included in an overlay to be generated for display;
   determining a first amount of time to consume the content of the overlay;
   determining a second amount of time for the object of interest to reach the projected location from the first location or from the second location; and
   in response to determining that the second amount of time exceeds the first amount of time, generating for display the overlay on top of the media asset at the projected location for a period of time that is less than the second amount of time.

2. The method of claim 1, further comprising:
   in response to determining that the second amount of time does not exceed the first amount of time, generating for display the overlay on top of the media asset at a portion of the media asset that does not obscure any point of a projected path of the object of interest.

3. The method of claim 1, wherein the amount of content that is to be included in the overlay is determined based on a type of content of the overlay.

4. The method of claim 1, wherein the first amount of time to consume the content of the overlay is determined based on a user profile of a user consuming the media asset.

5. The method of claim 1, further comprising:
   determining a size of the overlay;
   identifying a region in the second frame corresponding to the size of the overlay that is unchanged in the second frame as compared to the first frame; and
   determining whether the region overlaps with any of the first location, the second location, and the projected location;

wherein the generating for display of the overlay is performed in response to determining that the region does not overlap with any of the first location, the second location, and the projected location, and wherein the overlay is generated for display on top of the media asset within the region.

6. The method of claim 1, further comprising:
determining that the object of interest is not in the projected location of the third frame; and
in response to determining that the object of interest is not in the projected location of the third frame, ceasing the generating for display of the overlay on top of the media asset.

7. The method of claim 6, further comprising, further in response to determining that the object of interest is not in the projected location of the third frame:
updating a model used to calculate the projected location of the object of interest with data indicating that the calculation of the projected location of the object of interest has failed;
determining, based on the updated model, an updated projected location of the object of interest in a fourth frame of the media asset; and
generating for display the overlay on top of the media asset in a location that does not overlap the updated projected location.

8. The method of claim 1, wherein calculating, based on the first location and the second location, the projected location of the object of interest in the third frame of the media asset, comprises:
comparing the first location to the second location to determine a distance between the first location and the second location and a direction in which the object of interest is traveling;
comparing a time stamp of the first frame to a time stamp of the second frame to determine a time difference between the times at which the first frame and the second frame were broadcast;
determining a velocity of the object of interest based on the distance, the direction, and the time difference;
determining a projected time stamp of the third frame; and
determining the projected location based on where the object of interest will be in the third frame if the velocity is substantially maintained.

9. The method of claim 1, wherein:
the media asset is a live broadcast of a sporting event;
the object of interest is a person participating in the sporting event;
the first location is the same as the second location, and the method further comprises:
accessing a profile of the person; and
determining, based on information of the profile, a preferred direction that the person tends to travel when participating in the sporting event, wherein calculating the projected location of the object of interest in the third frame of the media asset further comprises basing the projected location on the preferred direction.

10. The method of claim 2, wherein:
the media asset is a live broadcast of a sporting event;
the object of interest is a ball;
the method further comprises:
detecting, in a fourth frame of the media asset, a person at a third position;
detecting, in a fifth frame of the media asset, the person at a fourth position;
determining, based on movement of the person between the third position and the fourth position, that the person is likely to interact with the ball; and
calculating an updated projected position for a sixth frame of the media asset of the ball based on the movement of the person between the third position and the fourth position.

11. A system comprising:
memory;
control circuitry configured to:
detect an object of interest in a first frame of a media asset;
determine a first location of the object of interest in the first frame;
determine a second location of the object of interest in a second frame of the media asset, wherein the first location and the second location are stored in the memory;
calculate, based on the first location and the second location, a projected location of the object of interest in a third frame of the media asset that is displayed after the first frame and the second frame;
determine an amount of content that is to be included in an overlay to be generated for display;
determine a first amount of time to consume the content of the overlay;
determine a second amount of time for the object of interest to reach the projected location from the first location or from the second location; and
in response to determining that the second amount of time exceeds the first amount of time, generate for display the overlay on top of the media asset at the projected location for a period of time that is less than the second amount of time.

12. The system of claim 11, the control circuitry is further configured to:
in response to determining that the second amount of time does not exceed the first amount of time, generate for display the overlay on top of the media asset at a portion of the media asset that does not obscure any point of a projected path of the object of interest.

13. The system of claim 11, wherein the control circuitry is configured to determine the amount of content that is to be included in the overlay based on a type of content of the overlay.

14. The system of claim 11, wherein the control circuitry is configured to determine the first amount of time to consume the content of the overlay based on a user profile of a user consuming the media asset.

15. The system of claim 11, wherein the control circuitry is further configured to:
determine a size of the overlay;
identify a region in the second frame corresponding to the size of the overlay that is unchanged in the second frame as compared to the first frame; and
determine whether the region overlaps with any of the first location, the second location, and the projected location;
generate for display of the overlay in response to determining that the region does not overlap with any of the first location, the second location, and the projected location; and
generate for display the overlay on top of the media asset within the region.

16. The system of claim 11, wherein the control circuitry is further configured to:

determine that the object of interest is not in the projected location of the third frame; and in response to determining that the object of interest is not in the projected location of the third frame, cease the generating for display of the overlay on top of the media asset.

17. The system of claim 16, wherein the control circuitry is further configured to, in response to determining that the object of interest is not in the projected location of the third frame:

update a model used to calculate the projected location of the object of interest with data indicating that the calculation of the projected location of the object of interest has failed;

determine, based on the updated model, an updated projected location of the object of interest in a fourth frame of the media asset; and generate for display the overlay on top of the media asset in a location that does not overlap the updated projected location.

18. The system of claim 11, wherein the control circuitry is configured to calculate, based on the first location and the second location, the projected location of the object of interest in the third frame of the media asset, by:

comparing the first location to the second location to determine a distance between the first location and the second location and a direction in which the object of interest is traveling;

comparing a time stamp of the first frame to a time stamp of the second frame to determine a time difference between the times at which the first frame and the second frame were broadcast;

determining a velocity of the object of interest based on the distance, the direction, and the time difference;

determining a projected time stamp of the third frame; and determining the projected location based on where the object of interest will be in the third frame if the velocity is substantially maintained.

19. The system of claim 11, wherein:

the media asset is a live broadcast of a sporting event;

the object of interest is a person participating in the sporting event;

the first location and the second location are equal, and the control circuitry is further configured to:

access a profile of the person;

determine, based on information of the profile, a preferred direction that the person tends to travel when participating in the sporting event; and calculate the projected location of the object of interest in the third frame of the media asset further based on the preferred direction.

20. The system of claim 11, wherein:

the media asset is a live broadcast of a sporting event;

the object of interest is a ball; and the control circuitry is further configured to:

detect, in a fourth frame of the media asset, a person at a third position;

detect, in a fifth frame of the media asset, the person at a fourth position;

determine, based on movement of the person between the third position and the fourth position, that the person is likely to interact with the ball; and calculate an updated projected position for a sixth frame of the media asset of the ball based on the movement of the person between the third position and the fourth position.

\* \* \* \* \*